United States Patent [19]

Komazaki et al.

[11] Patent Number: 5,345,776
[45] Date of Patent: Sep. 13, 1994

[54] AIR CONDITIONING APPARATUS CAPABLE OF PERFORMING A DEHUMIDIFYING OPERATION

[75] Inventors: Megumi Komazaki, Yokohama; Hideaki Suzuki, Fujinomiya; Hideaki Motohashi, Yokohama; Keiichi Morita, Fujinomiya, all of Japan

[73] Assignee: Kabushiki Kaisha Toshiba, Kawasaki, Japan

[21] Appl. No.: 135,497

[22] Filed: Oct. 13, 1993

[30] Foreign Application Priority Data

Oct. 13, 1992 [JP] Japan ................................. 4-274418

[51] Int. Cl.$^5$ ............................................. F24F 11/02
[52] U.S. Cl. ........................................ 62/176.3; 62/181; 62/176.6; 62/228.4; 62/176.5; 236/44 C; 395/903
[58] Field of Search ................. 62/176.1, 176.3, 176.6, 62/180, 181, 183, 184, 160, 228.4, 203, 176.5, 173; 165/20, 21, 16; 236/49.3, 44 R, 44 A, 44 C, 78 D; 364/148, 557; 395/61, 900, 903

[56] References Cited

U.S. PATENT DOCUMENTS

| | | | |
|---|---|---|---|
| 4,257,238 | 3/1981 | Kountz et al. | 62/176.3 |
| 4,914,924 | 4/1990 | Takahashi | 395/903 |
| 4,984,433 | 1/1991 | Worthington | 62/176.6 X |
| 5,148,977 | 9/1992 | Hibino et al. | 236/49.3 |
| 5,193,144 | 3/1993 | Tsutsumi et al. | 395/900 |
| 5,231,845 | 8/1993 | Sumitani et al. | 62/181 X |
| 5,259,210 | 11/1993 | Ohya et al. | 236/78 D |
| 5,261,596 | 11/1993 | Tachibana et al. | 236/49.3 |
| 5,291,390 | 3/1994 | Satou | 364/148 |

FOREIGN PATENT DOCUMENTS 1276319 11/1989 Japan.
313751 1/1991 Japan.

*Primary Examiner*—Harry B. Tanner
*Attorney, Agent, or Firm*—Cushman, Darby & Cushman

[57] ABSTRACT

An air conditioner having a compressor, an outdoor fan, and two indoor heat exchangers which are connected by an electric expansion valve. During a dehumidifying operation, the opening of the electric expansion valve is decreased, thereby decompressing the refrigerant flowing from the first indoor heat exchange into the second indoor exchanger. The first and second heat exchangers thereby function as a reheater and an evaporator, respectively. The second indoor heat exchanger cools and dehumidifies the indoor air, and the first indoor heat exchanger heats the indoor air again. The indoor air, first cooled, then dehumidified, and finally re-heated, is supplied into the room. During the dehumidifying operation, a deviation (T) of the indoor temperature (Ta) from a preset indoor temperature (Ts), and a change ($\Delta T$) in the deviation (T) are detected, and the deviation (H) of the indoor humidity (Ha) from a preset indoor humidity (Hs), and a change ($\Delta H$) are also detected. Fuzzy inference is performed based on the deviation (T), the change ($\Delta T$), the deviation (H) and the change ($\Delta H$), thereby calculating an adjustment value ($\Delta F$) and an adjustment value ($\Delta N$). The value ($\Delta F$) adjusts the drive frequency of the compressor, and the value ($\Delta N$) adjusts the rotational speed (N) of the outdoor fan.

10 Claims, 11 Drawing Sheets

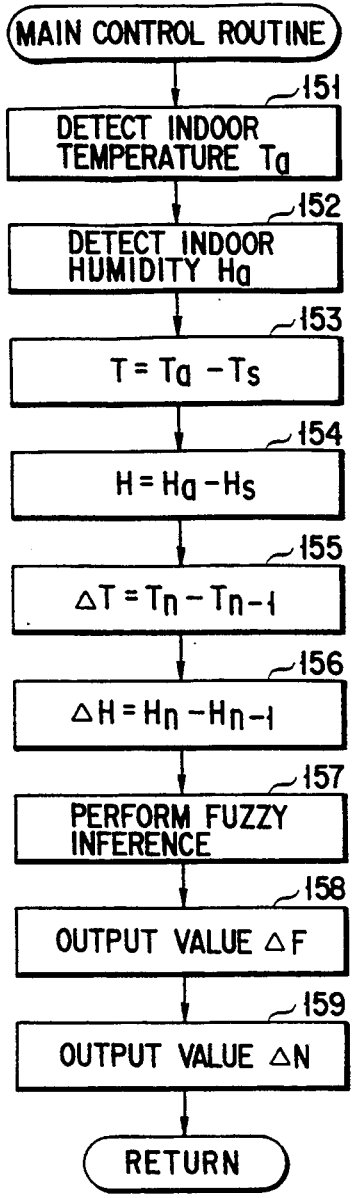
F I G. 4
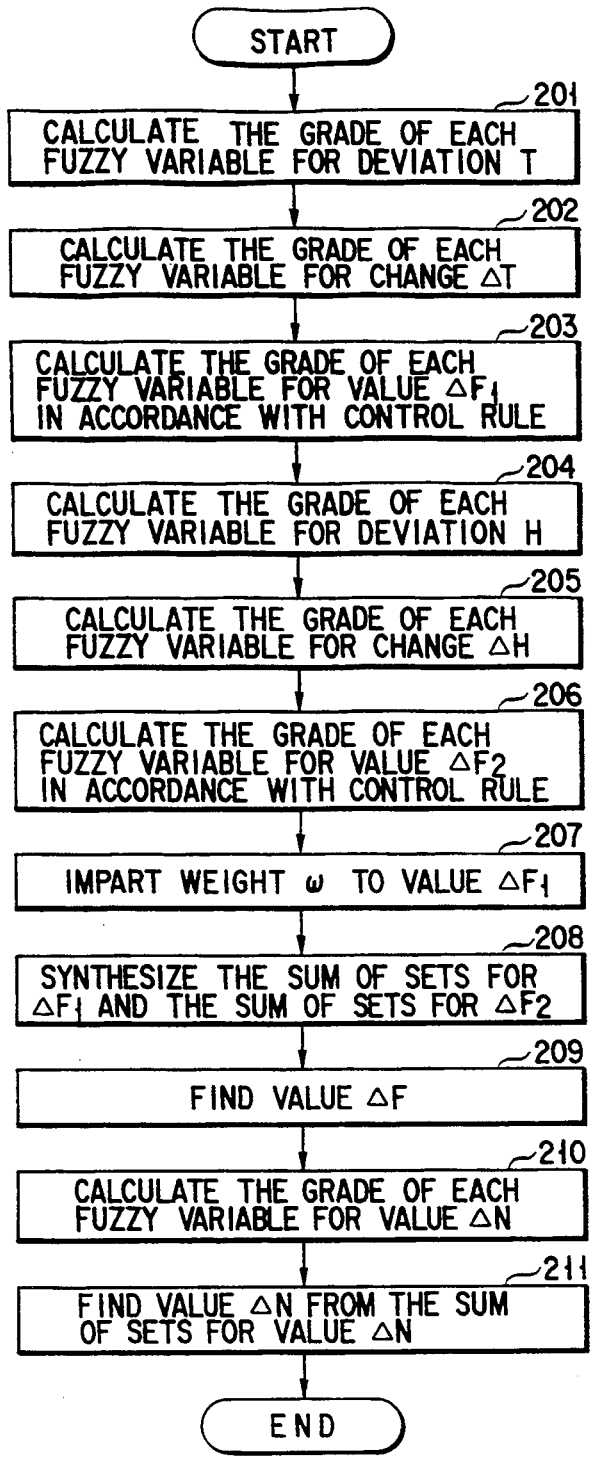
F I G. 5

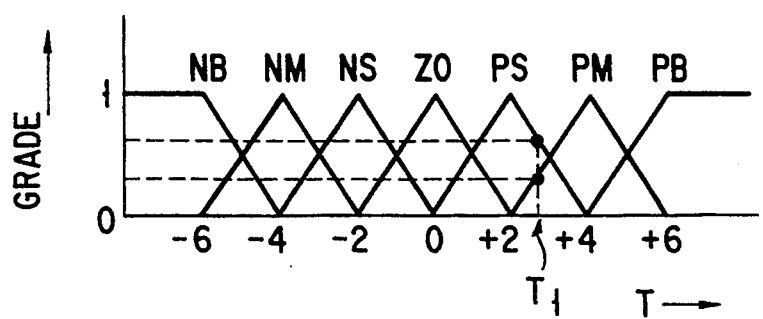
F I G. 6
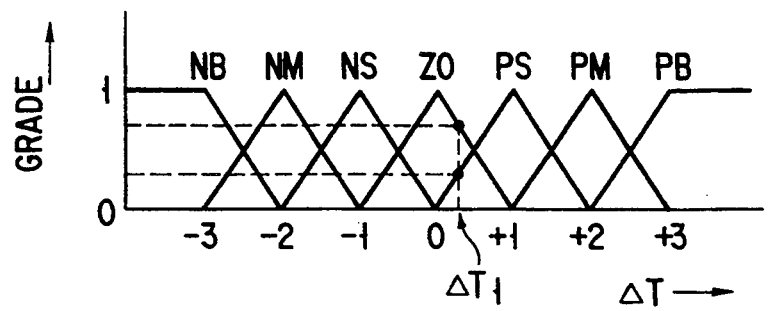
F I G. 7
F I G. 8

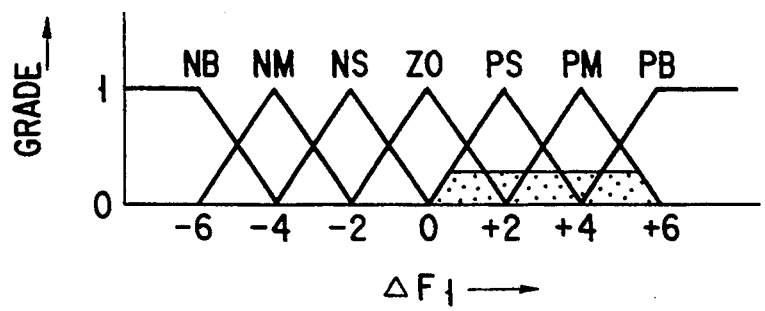
F I G. 9
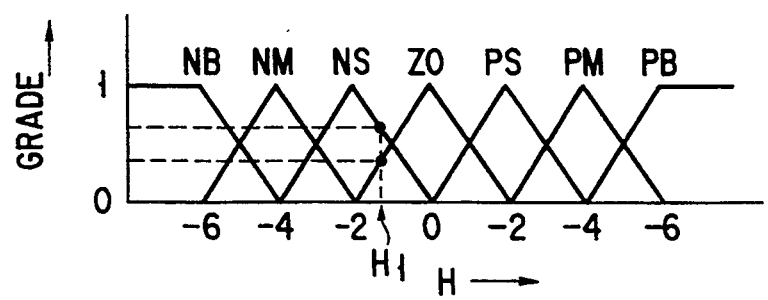
F I G. 10
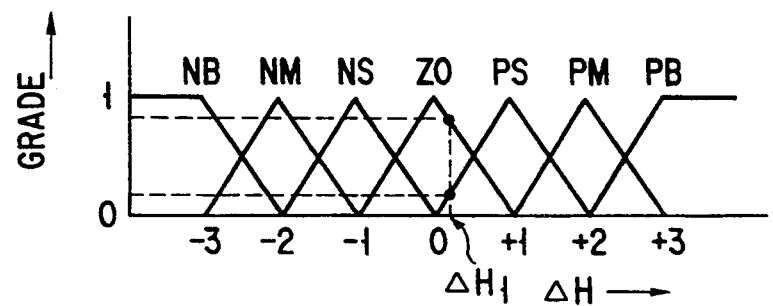
F I G. 11

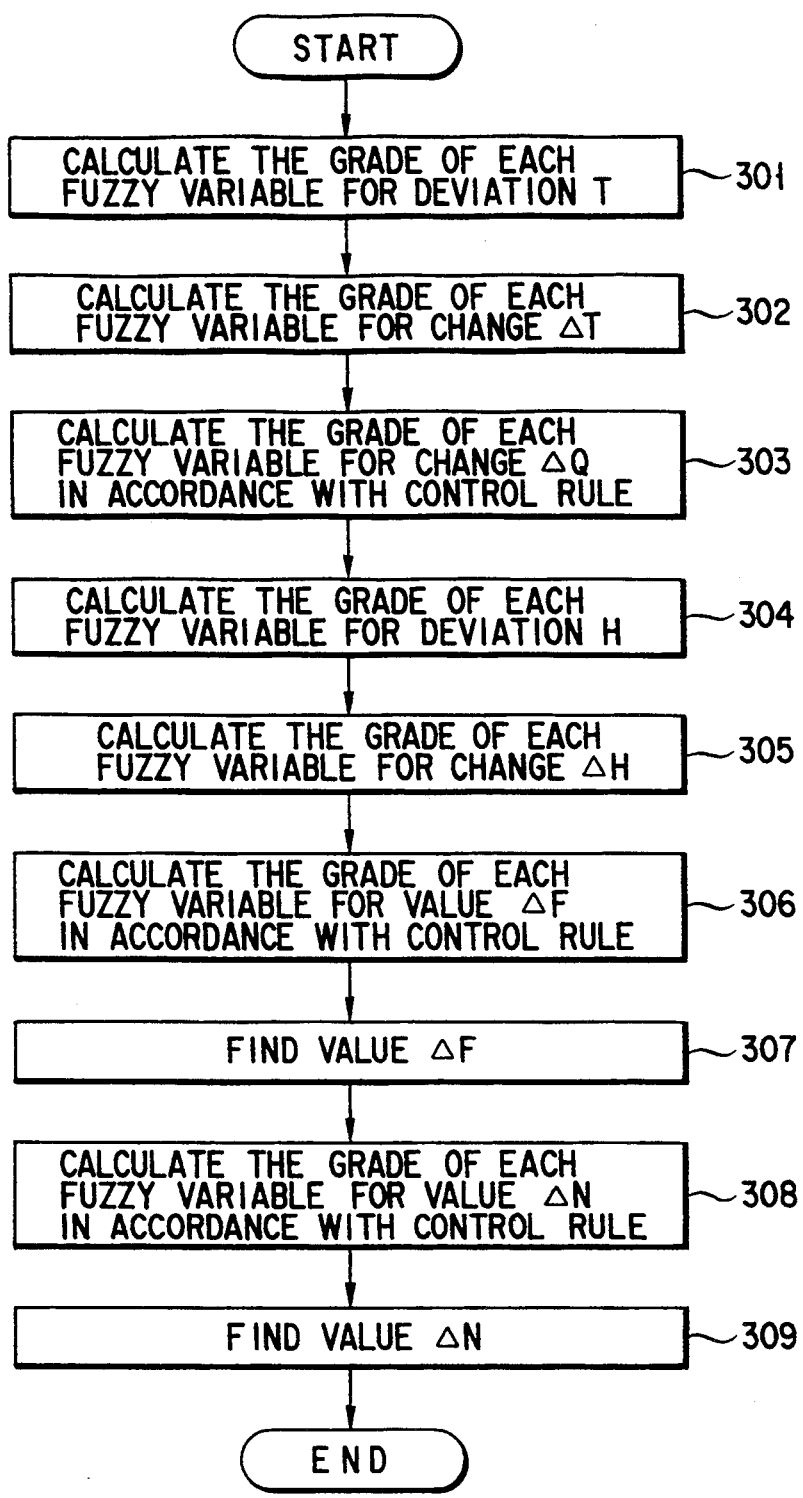
F I G. 18

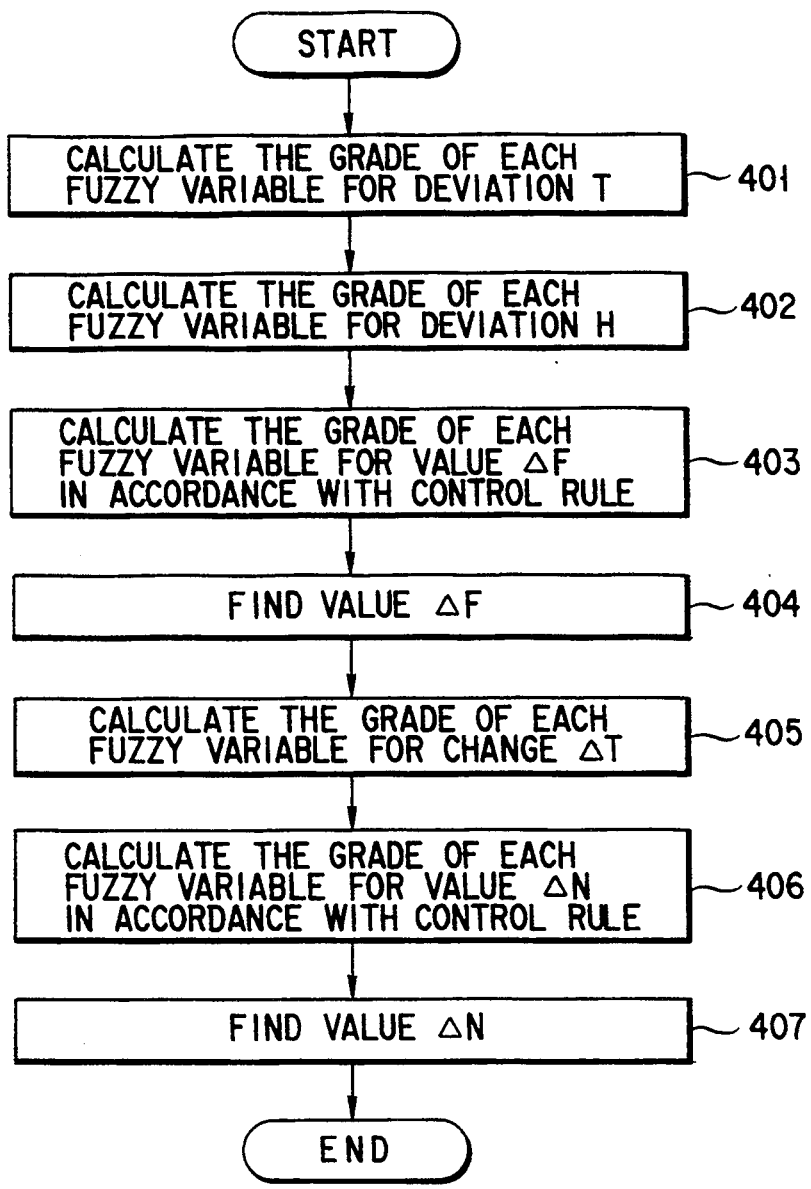
F I G. 19

AIR CONDITIONING APPARATUS CAPABLE OF PERFORMING A DEHUMIDIFYING OPERATION

BACKGROUND OF THE INVENTION

1. Field of the Invention

The present invention relates to an air conditioning apparatus which can perform a dehumidifying operation, to thereby removing water from the air in a room.

2. Description of the Related Art

Air conditioners are known which have two indoor heat exchangers located in a room and in which these heat exchangers can be used as evaporators to cool the room, and also as an evaporator and a condenser, respectively, to dehumidifying the room. In the dehumidifying operation, one of the indoor heat exchangers is used as an evaporator to cool the room, whereas the other indoor heat exchanger is used as a condenser to reheat the air thus cooled and hence dehumidified, to room temperature. The air dehumidified and reheated is supplied into the room.

Among these air conditioners are two types. In the first type, both the indoor temperature and the indoor humidity are measured during the dehumidifying operation, and the frequency of driving the compressor is determined in accordance with the position the indoor temperature and the indoor humidity relationship assumes in a matrix chart. In the second type, the rotational speed of the outdoor fan is controlled in accordance with the indoor temperature, to thereby change the sensible heat of the outdoor heat exchanger to adjust the temperature of the air which is being supplied into the room.

It is desirable that an air conditioner control the temperature and humidity in a room in accordance with various load conditions. Among these conditions are: the structure of the building including the room; the climate of the region where the building is located; and the bodily sensation of the persons staying in the room.

An air conditioner which controls the indoor temperature and the indoor humidity is disclosed in Jpn. Pat. Appln. KOKAI Publication No. 3-13751. This air conditioner has sensors and a microcomputer. The sensors detects the indoor conditions. The microcomputer performs fuzzy inference based on the indoor conditions detected, thereby determining an optimal temperature to which air should be heated before supplied into the room and also an optimal amount in which the heated air should be supplied into the room. The outdoor heat exchanger heats air to the optimal temperature, and the air thus heated is supplied into the room in the optimal amount. The indoor temperature is thereby maintained at a preset value desirable for the people staying in the room.

Another air conditioner which controls the indoor temperature and the indoor humidity is disclosed in Jpn. Pat. Appln. KOKAI Publication No. 1-276319. In this air conditioner, the indoor temperature and the changes thereof are detected and used to control the capacity of the compressor.

The air conditioners disclosed in these publications control the indoor temperature only. They cannot control the indoor humidity.

SUMMARY OF THE INVENTION

The object of the present invention is to provide an air conditioner which can control both indoor temperature and indoor humidity fast and optimally in accordance with various load conditions.

According to the invention, there is provided an air conditioner apparatus capable of performing a dehumidifying operation, comprising:

a compressor for compressing refrigerant and supplying compressed refrigerant;

an outdoor heat exchanger for exchanging heat between the refrigerant and outdoor air;

an outdoor fan for supplying the outdoor air into the outdoor heat exchanger;

pressure reducing means for reducing the pressure of the refrigerant;

a first indoor heat exchanger for exchanging heat between the refrigerant and indoor air;

an electric expansion valve whose opening can change;

a second indoor heat exchanger for exchanging heat between the refrigerant and the indoor air;

an indoor fan for circulating the indoor air through the second indoor heat exchanger and the first indoor heat exchanger;

first control means for supplying the refrigerant from the compressor back in to the compressor through the outdoor heat exchanger, the pressure reducing means, the first indoor heat exchanger, the electric expansion valve and the second indoor heat exchanger, and for opening the electric expansion valve fully, to thereby perform cooling operation;

second control means for supplying the refrigerant from the compressor back into the compressor through the first indoor heat exchanger, the electric expansion valve and the second indoor heat exchanger, and for reducing the opening of the electric expansion valve, to thereby perform dehumidifying operation;

an indoor temperature sensor for detecting indoor temperature Ta;

an indoor humidity sensor for detecting indoor humidity Ha;

first detection means for detecting a deviation T of the indoor temperature Ta from a preset indoor temperature Ts and a change $\Delta T$ in the deviation T, during the dehumidifying operation;

second detection means for detecting a deviation H of the indoor humidity Ha from a preset indoor humidity Hs and a change $\Delta H$ in the deviation H;

adjustment value calculating means for performing fuzzy inference based on the deviation T, the change $\Delta T$, the deviation H and the change $\Delta H$, to thereby calculate an adjustment value $\Delta F$ for adjusting a drive frequency F of the compressor and an adjustment value $\Delta N$ for adjusting a rotational speed N of the outdoor fan;

first adjustment means for adjusting the drive frequency F of the compressor by the adjustment value $\Delta F$; and second adjustment means for adjusting the rotational speed N of the outdoor fan by the adjustment value $\Delta N$.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 is a flow chart explaining the main control routine performed during the dehumidifying operation of the air conditioner;

FIG. 5 is a flow chart explaining the fuzzy inference effected during the dehumidifying operation of the air conditioner;

FIG. 6 is a graph representing a membership function for deviation T, which is used in the fuzzy inference performed in the air conditioner;

FIG. 7 is a graph illustrating a membership function for a change $\Delta T$ in the deviation T, which is used in the fuzzy inference;

FIG. 8 is a diagram showing the format of a control rule applied in calculating the grade of each fuzzy variable for an adjustment value $\Delta F_1$;

FIG. 9 is a graph representing a membership function for the adjustment value $\Delta F_1$, which is used in the air conditioner;

FIG. 10 is a graph representing a membership function for deviation H, which is used in the fuzzy inference performed in the air conditioner;

FIG. 11 is a graph illustrating a membership function for a change $\Delta H$ in the deviation H, which is used in the fuzzy inference;

FIG. 18 is a flow chart for explaining a modification of the fuzzy inference; and FIG. 19 is a flow chart for explaining another modification of the fuzzy inference.

DETAILED DESCRIPTION OF THE PREFERRED EMBODIMENT

An embodiment of this invention will be described, with reference to the accompanying drawings.

Figure 1:
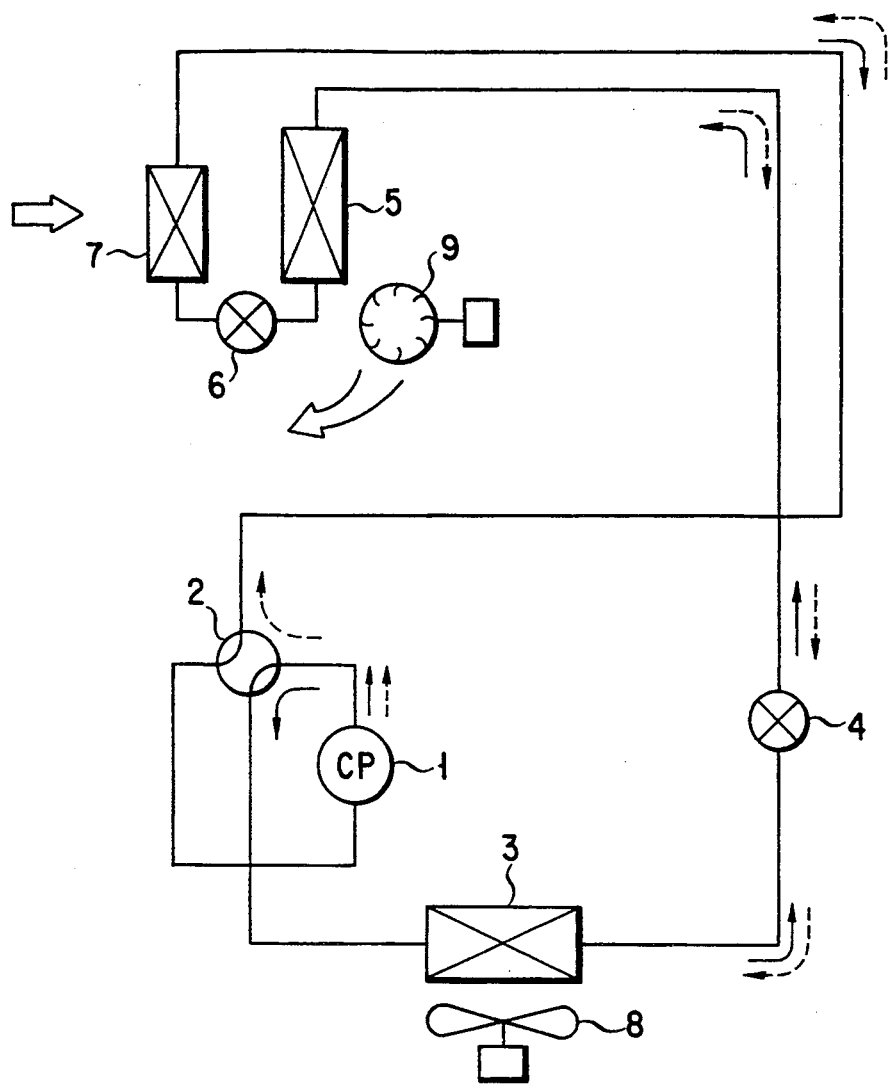
FIG. 1 is a block diagram illustrating the refrigerating cycle of an air conditioner according to an embodiment of the present invention.

FIG. 1 shows the refrigerating cycle of an air conditioner according to the present invention. As shown in FIG. 1, the air conditioner comprises a compressor 1, a four-way valve 2, an outdoor heat exchanger 3, a first electric expansion valve 4 (first expansion mechanism), a first indoor heat exchanger 5, a second electric expansion valve 6 (second expansion mechanism), a second indoor heat exchanger 7, an outdoor fan 8, and an indoor fan 9.

The four-way valve 2 is connected to the discharge port of the compressor 1, coupling the outdoor heat exchanger 3 to the compressor 1. The outdoor heat exchanger 3 exchanges heat between the refrigerant used in the cycle and the outdoor air.

The first electric expansion valve 4, which is a means for reducing the pressure of the refrigerant, connects the first indoor heat exchanger 5 to the outdoor heat exchanger 3. The first indoor heat exchanger 5 exchanges heat between the refrigerant and the indoor air.

The second electric expansion valve 6 connects the second indoor heat exchanger 7 to the first indoor heat exchanger 5. The four-way valve 2 connects the inlet of the compressor 1 to the second indoor heat exchanger 7.

Both electric expansion valves 4 and 6 are pulse motor valves whose opening continuously changes in accordance with the number of input drive pulses. Hereinafter, either electronic expansion valve will be referred to as "PMV."

One of the PMVs 4 and 6, which are the first and second expansion mechanisms, may be replaced by an expansion mechanism which comprises a parallel circuit constituted by a two-way valve and a capillary tube.

The outdoor fan 8 is located in the duct connected to the outdoor heat exchanger 3. The fan 8 is used to supply the indoor air into the outdoor heat exchanger 3. It can be driven at a continuously changing speed. The indoor fan 9 is connected to the duct which in turn coupled to the indoor heat exchangers 5 and 7. The fan 9 is used to circulate the indoor air through the indoor heat exchangers 5 and 7.

The air conditioner described above incorporates a control circuit. The control circuit will be described, with reference to FIG. 2.

Figure 2:
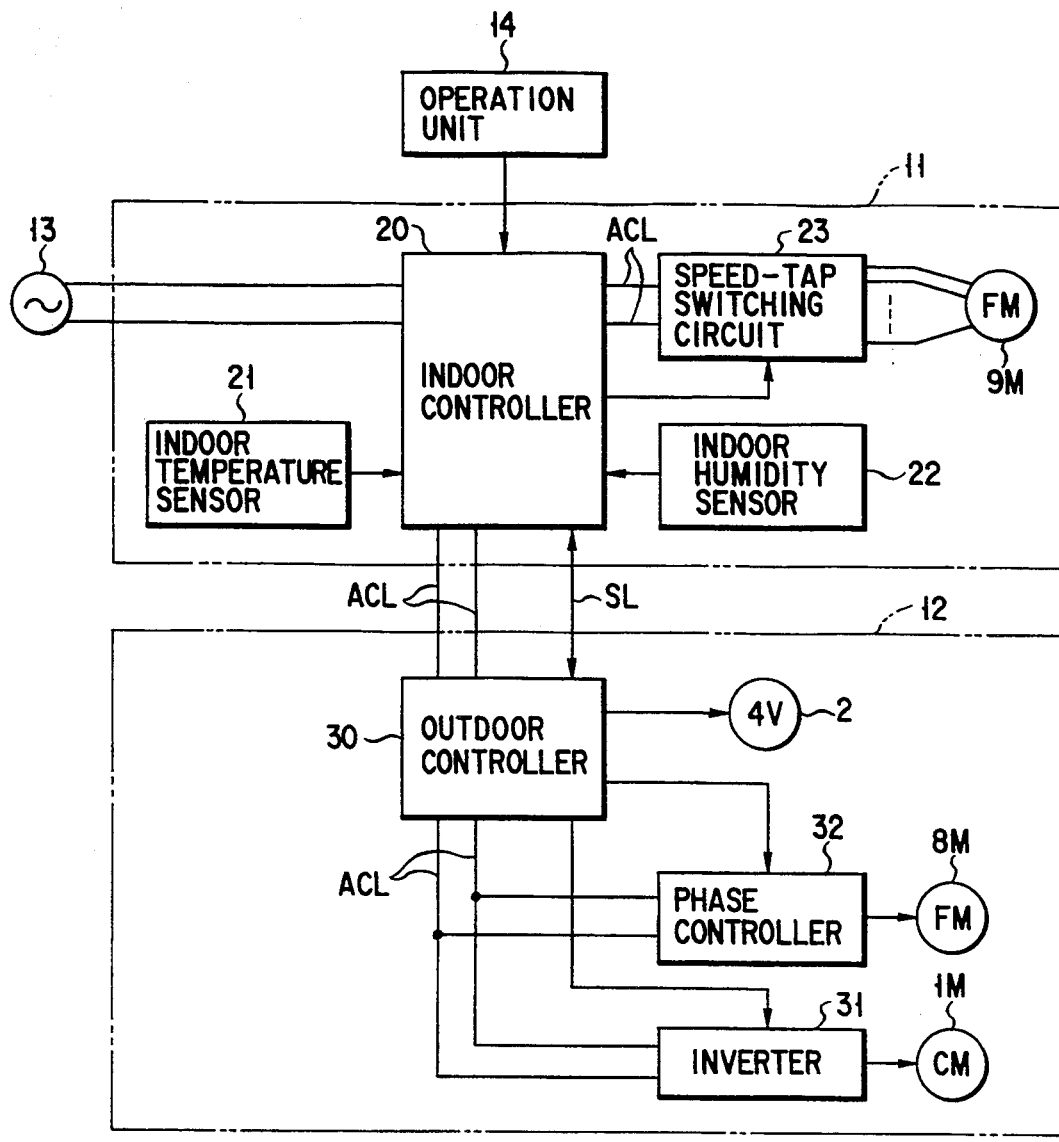
FIG. 2 is a block diagram showing the control circuit incorporated in the air conditioner.

As shown in FIG. 2, the control circuit comprises an indoor unit 11, an outdoor unit 12, and an operation unit 14. The indoor unit 11 comprises an indoor controller 20, and the outdoor unit 12 comprises an outdoor controller 30. The outdoor controller 30 is connected to the indoor controller 20 of the indoor unit 11 by a power-supply line ACL and a serial-data line SL. The power-supply line ACL is provided for applying a power-supply voltage to the outdoor controller 30 from a commercial power supply 13 which is connected to the indoor controller 20. The serial-data line SL is used to supply serial-data signals from the indoor controller 20 to the outdoor controller 30 and vice versa.

The indoor unit 11 further comprises an indoor temperature sensor 21, an indoor humidity sensor 22, and a speed-tap switching circuit 23. The sensors 21 and 22 and the circuit 23 are connected to the indoor controller 20. The speed-tap switching circuit 23 is connected to the motor 9M of the indoor fan 9. The motor 9M is incorporated in the indoor fan 9; it has a plurality of seed taps. The speed-tap switching circuit 23 selects one of the speed-taps of the motor 9M in accordance with a selection signal supplied from the indoor controller 20. An electric current is supplied from the power supply 13 to the speed tap thus selected, whereby the indoor fan motor 9M is driven at the speed assigned to the selected speed-tap.

The outdoor unit 12 further comprises an inverter 31 and a phase controller 32, both connected to the outdoor controller 30. The outdoor controller 30 is connected to the four-way valve 2. The inverter 31 rectifies the power-supply voltage and converts the voltage to an AC voltage having a frequency F assigned by a signal supplied from the outdoor controller 30. The AC voltage is supplied to the motor 1M of the compressor 1. The phase controller 32 controls the phase of the motor 8M of the outdoor fan 8 in accordance with a control signal supplied from the outdoor controller 30, whereby the outdoor fan 8 is driven at any desired speed.

The indoor controller 20 and the outdoor controller 30 comprise a microcomputer and peripheral circuits each. Serial data signals, which are synchronous with the power-supply voltage, are transferred between the controllers 20 and 30. Thus, the controllers 20 and 30 control the other components of the air conditioner. The indoor controller 20 and the outdoor controller 30 have the following means each:

(1) Means for driving the compressor 1 such that the refrigerant circulates from the compressor 1 and back thereinto through the four-way valve 2, the outdoor heat exchanger 3, the PMV 4, the first indoor heat exchanger 5, the PMV 6, the second indoor heat exchanger 7, and the four-way valve 2, and for reducing the opening of the PMV 4 and opening the PMV 6 fully, thereby performing cooling operation.

(2) Means for driving the compressor 1 such that the refrigerant circulates from the compressor 1 and back thereinto through the four-way valve 2, the outdoor heat exchanger 3, the PMV 4, the first indoor heat exchanger 5, the PMV 6, the second indoor heat exchanger 7, and the four-way valve 2, and for opening the PMV 4 fully and reducing the opening of the PMV 6, thereby performing dehumidifying operation.

(3) Means for driving the compressor 1 such that the refrigerant circulates from the compressor 1 and back thereinto through the four-way valve 2, the second indoor heat exchanger 7, the PMV 6, the first indoor heat exchanger 5, the PMV 4, the outdoor heat exchanger 3, and the four-way valve 2, and for opening the PMV 6 fully and reducing the opening of the PMV 4, thereby performing heating operation.

(4) Means for selecting the cooling mode, the dehumidifying mode, or the heating mode, in accordance with the operation of the operation unit 14.

(5) Means for detecting a deviation T of the indoor temperature Ta detected by the sensor 21 from the temperature Ts set by operating the unit 14, and for changing the drive frequency F of the compressor 1 (i.e., the output frequency of the inverter 31) in accordance with the deviation T—during the cooling operation and the heating operation.

(6) Means for detecting the deviation T and a change $\Delta T$, if any, in the deviation T—during the dehumidifying operation. The change $\Delta T$ is a difference between the different T measured at present and the deviation T measured a predetermined period before.

(7) Means for detecting a deviation H of the indoor humidity Ha detected the sensor 22 from the humidity set by operating the unit 14 and also a change $\Delta H$, if any, in the deviation H—during the dehumidifying operation. The change $\Delta H$ is a difference between the deviation H measured at present and the deviation H measured the predetermined period before.

(8) Means for performing fuzzy inference from the deviation T, the change $\Delta T$, the deviation H and the change $\Delta H$, thereby to obtain a value $\Delta F$ by which to adjust the drive frequency F of the compressor 1 and a value $\Delta N$ by which to adjust the rotational speed N of the outdoor fan 8.

(9) Means for changing or correcting the drive frequency F of the compressor 1 by the value $\Delta F$ obtained by the fuzzy inference.

(10) Means for changing or correcting the rotational speed N of the outdoor fan 8 by the value $\Delta N$ obtained by the fuzzy inference.

Figure 3A:
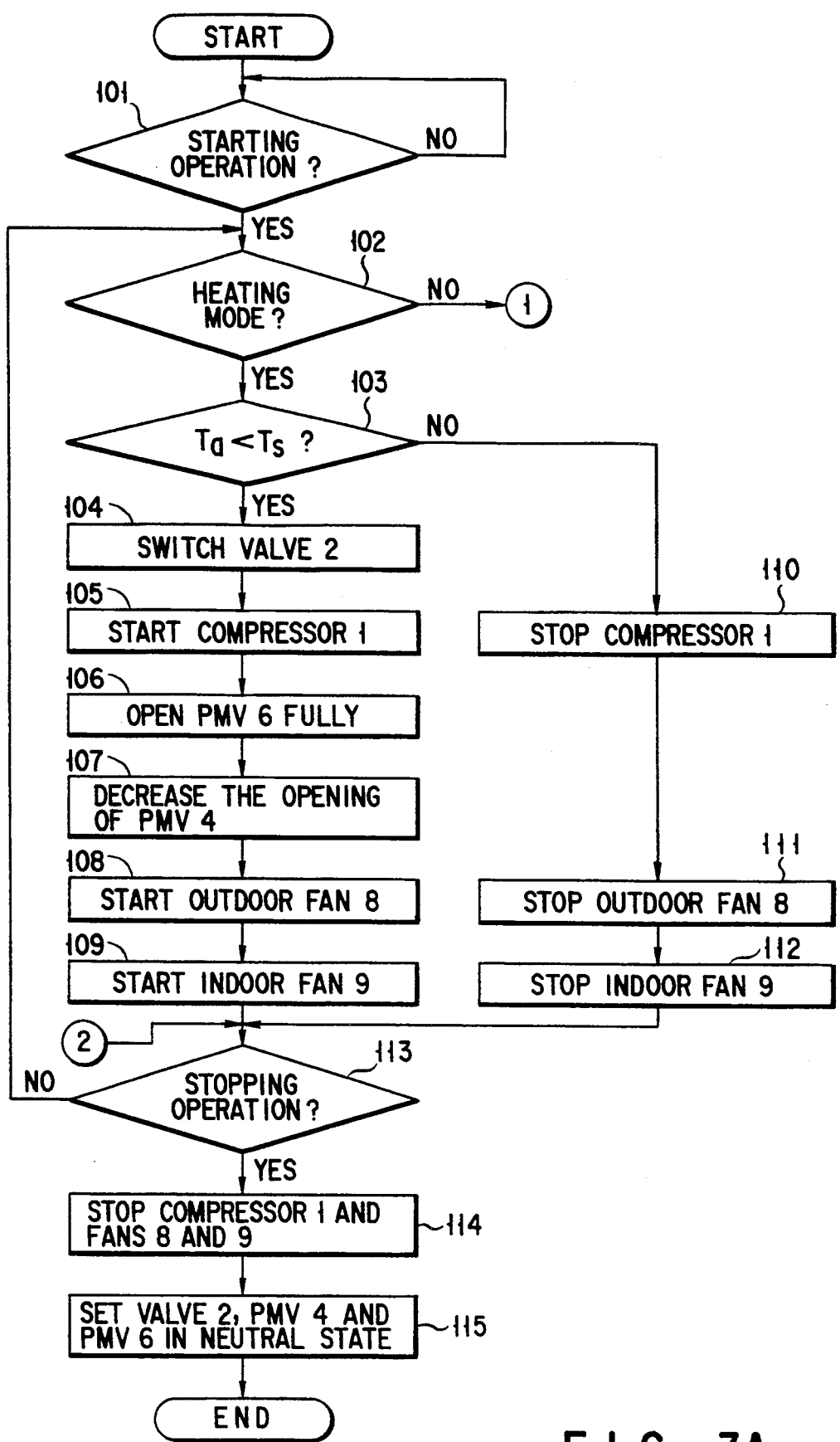
FIGS. 3A and 3B are a flow chart explaining the operation of the air conditioner.
Figure 3B:
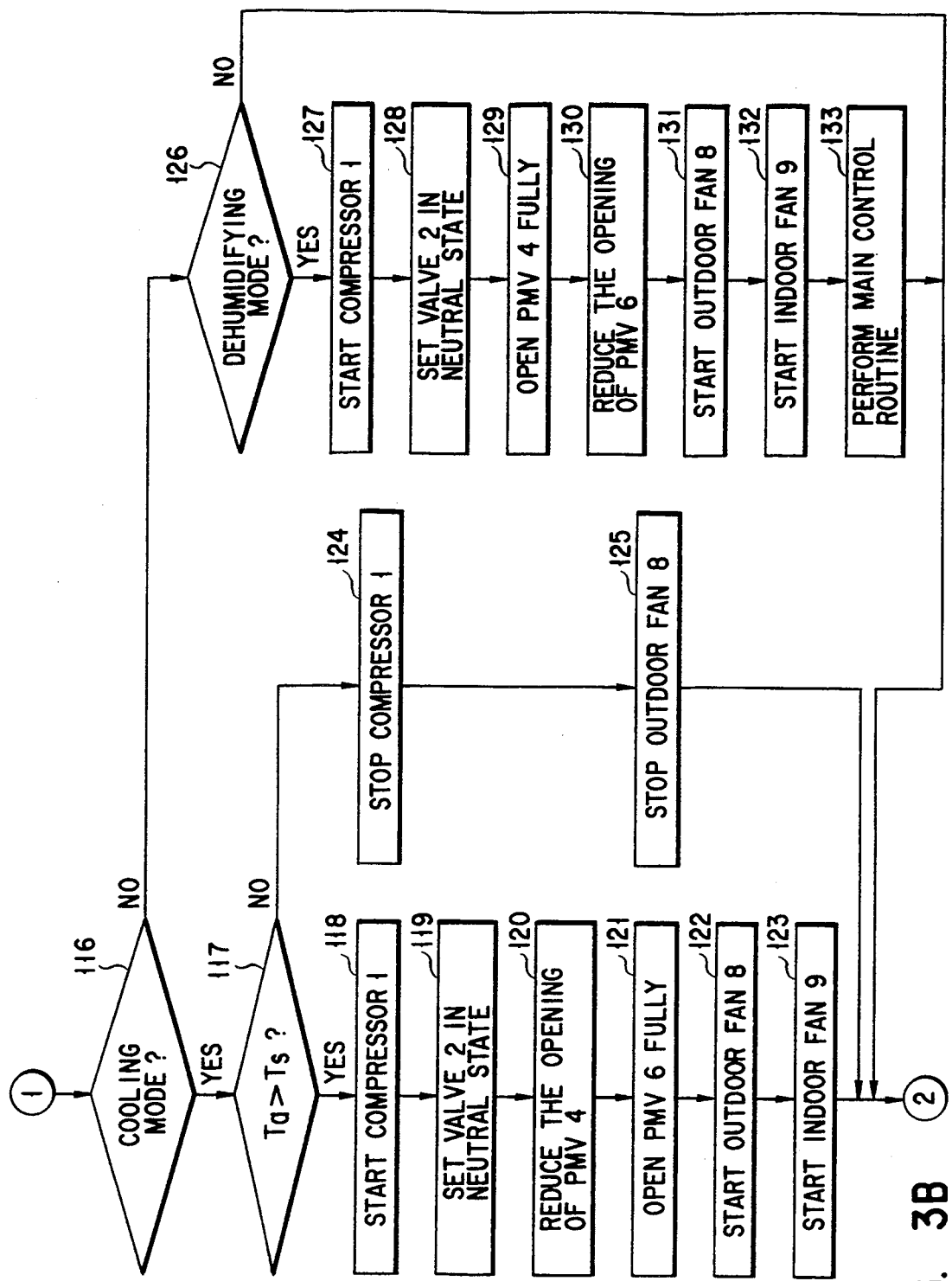

The operation of the air conditioner will be described, with reference to the flow chart of FIGS. 3A and 3B.

First, it is determined in Step 101 whether or not the power supply switch (not shown) of the air conditioner has been turned on. If No, Step 101 is repeated until the power-supply switch is turned on. If Yes, the flow goes to Step 102. In Step 102 it is determined whether or not the heating mode has been selected by operating the unit 14. If Yes, the flow goes to Step 103. In Step 103 it is determined whether the indoor temperature Ta detected by the sensor 21 is lower than the preset temperature Ts. If Yes, the flow goes to Step 104.

In Step 104, the outdoor controller 30 switches the four-way valve 2, whereby the valve 2 connects the delivery port of the compressor 1 to the second indoor heat exchanger 7, and the inlet of the compressor 1 to the outdoor heat exchanger 3. In Step 105, the compressor 1 is started. Next, in Step 106, the PMV 6 is opened fully. In Step 107, the opening of the PMV 4 is decreased. In Step 108, the outdoor fan 8 is started. In Step 109, the indoor fan 9 is started.

As a result, the refrigerant circulates in the direction indicated by broken-line arrows in FIG. 1. More precisely, the liquid refrigerant flows from the compressor 1 via the four-way valve 2 into the second indoor heat exchanger 7, and hence into the first indoor heat exchanger 5 via the PMV 6 now fully opened. In both indoor heat exchangers 5 and 7, the refrigerant releases heat into the indoor air and therefore liquefies. The liquid refrigerant flows into the PMV 4. In the PMV 4, the refrigerant is decompressed so that it may gasify more readily than otherwise. The refrigerant flows from the PMV 4 into the outdoor heat exchanger 3. In the outdoor heat exchanger 3, the liquid refrigerant absorbs heat from the indoor air and therefore gasifies. The gas refrigerant is supplied from the outdoor heat exchanger 3 into the compressor 1 through the four-way valve 2.

The refrigerant is thus circulated in a heating cycle. During the heating cycle, both indoor heat exchangers 5 and 7 function as condensers, and the outdoor heat exchanger 3 functions as an evaporator. The room for which the air conditioner is installed is thereby heated.

If No in Step 103, that is, if the indoor temperature Ta detected by the sensor 21 is higher or equal to the preset temperature Ts, the flow goes to Step 110. In Step 110, the compressor 1 is stopped. In Step 111, the outdoor fan 8 is stopped. In Step 112, the indoor fan 9 is stopped. The heating operation is thereby interrupted.

When it is detected in Step 103 that the indoor temperature Ta falls below the set value Ts (Ta<Ts), the heating operation is started again.

The flow goes from Step 109 or Step 112 to Step 113. In Step 113 it is determined whether or not the operation unit 14 has been operated to stop the heating cycle. If Yes, the flow goes to Step 114, in which the compressor 1, the outdoor fan 8, and the indoor fan 9 are stopped. Then, in Step 115, the four-way valve 2, the PMV 4, and the PMV 6 are set in neutral state. The heating operation is thereby terminated.

Throughout the heating operation, the opening of the PMV 4 is continuously adjusted, thereby the degree of superheat of the refrigerant in the indoor heat exchangers 5 and 7 should be constant.

If No in Step 102, that is, if it is determined that the heating mode has been not been selected by operating the unit 14, the flow goes to Step 116. In Step 116 it is determined whether or not the cooling mode has been selected by operating the unit 14. If Yes, the flow goes to Step 117. In Step 117 it is determined whether or not the indoor temperature Ta detected by the sensor 21 is higher than the preset temperature Ts. If Yes, the flow goes to Step 118. In Step 118, the compressor 1 is started. In Step 119, the four-way valve 2 is set in the neutral state. In Step 120, the opening of the PMV 4 is reduced. In Step 121 the PMV 6 is fully opened. In Step 122 the outdoor fan 8 is started, and in Step 123 the indoor fan 9 is started.

As a result, the refrigerant circulates in the direction indicated by solid-line arrows in FIG. 1. More specifically, the liquid refrigerant flows from the compressor 1 via the four-way valve 2 into the outdoor heat exchanger 3, and hence into the PMV 4. In the PMV 4, the liquid refrigerant is decompressed so that it may gasify more readily than otherwise. The refrigerant flows from the PMV 4 into the first indoor heat exchanger 5, and hence into the second indoor heat exchanger 7 via the PMV 6 which is fully opened. In both indoor heat exchangers 5 and 7, the refrigerant absorbs heat from the indoor air and therefore gasifies. The gas refrigerant is forced into the compressor 1 via the four-way valve 2.

The refrigerant is thus circulated in a cooling cycle. During the cooling cycle, both indoor heat exchangers 5 and 7 function as evaporators, whereas the outdoor heat exchanger 3 functions as a condenser. The room is thereby cooled.

If No in Step 117, that is, if the indoor temperature Ta is equal to or lower than the set value Ts, the flow goes to Step 124. In Step 124, the compressor 1 is stopped. Then, in Step 125 the outdoor fan 8 is stopped. The cooling operation is thereby interrupted.

When it is detected in Step 117 that the indoor temperature Ta has risen above the set value Ts (Ta>Ts), the cooling operation is started again.

Throughout the cooling cycle, the opening of the PMV 4 is continuously adjusted, thereby the degree of superheat of the refrigerant in the outdoor heat exchanger 3 should be constant.

If No in Step 116, that is, if it is determined that the cooling mode has not selected, then the flow goes to Step 126. In Step 126, it is determined whether or not dehumidifying mode has been selected by operating the unit 14. If Yes, the flow goes to Step 127. In Step 127, the compressor 1 is started. In Step 128, the four-way valve 2 is set in neutral state. In Step 129 the PMV 4 is opened fully, and in Step 130 the opening of the PMV 6 is reduced. Then, in Step 131 the outdoor fan 8 is started, in Step 131 the indoor fan 9 is started, and in Step 132 the indoor fan 9 is started.

As a result, the refrigerant circulates in the direction indicated by solid-line arrows in FIG. 1. That is, the refrigerant flows from the compressor 1 via the four-way valve 2 into the outdoor heat exchanger 3, and hence into the first indoor heat exchanger 5 through the PMV 4. In the outdoor heat exchanger 3 and the first indoor heat exchanger 5, the refrigerant releases heat into the indoor air and liquefies. The liquid refrigerant flows from the first indoor heat exchanger 5 into the PMV 6 and is decompressed therein so that it may gasify more readily than otherwise. The decompressed refrigerant then flows into the second indoor heat exchanger 7. In the second heat exchanger 7, the refrigerant absorbs heat from the indoor air and therefore gasifies. The gas refrigerant is then drawn into the compressor 1 through the four-way valve 2.

The refrigerant is thus circulated in a dehumidifying cycle. During the dehumidifying cycle, the first indoor heat exchanger 5 functions as a condenser, whereas the second indoor heat exchanger 7 function as an evaporator. The indoor air is cooled by the second indoor heat exchanger 7. As indoor air is cooled by the second indoor heat exchanger 7, the water in the air form drain on the heat exchanger 7. The air is therefore dehumidified. The air, thus cooled and dehumidified, is reheated by the first indoor heat exchanger 5. The heated air is supplied into the room.

During the dehumidifying operation, more precisely in Step 133, a main control routine is performed, as will be explained with reference to the flow chart of FIG. 4.

First, the indoor temperature Ta is detected in Step 151. Then, the indoor humidity Ha is detected in Step 152. In Step 153, it is detected how much the temperature Ta deviates from the set value Ts, thus obtaining a deviation T (=Ta−Ts). In Step 154, it is detected how much the humidity Ha deviates from the set value Hs, thereby obtaining a deviation H (=Ha−Hs). Then, the flow goes to Step 155, in which a change $\Delta T$ in the deviation T is detected. The change $\Delta T$ is a difference between the deviation $T_n$ detected at present and the deviation $T_{n-1}$ detected a prescribed period before. Thus, $\Delta T = T_n - T_{n-1}$. In Step 156, a change $\Delta H$ is detected. The change $\Delta H$ is a difference between the deviation $H_n$ detected at present and the deviation $H_{n-1}$ detected a prescribed period before. Thus, $\Delta H = H_n - H_{n-1}$.

Next, in Step 157, fuzzy inference is performed based on the deviation T, the change $\Delta T$, the deviation H and the change $\Delta H$, thereby obtaining a value $\Delta F$ by which to adjust the drive frequency F of the compressor 1 and a value $\Delta N$ by which to adjust the rotational speed N of the outdoor fan 8. In Step 158, the adjustment value $\Delta F$ is output, whereby the drive frequency F of the compressor 1 is adjusted by the value $\Delta F$. In Step 159, the adjustment value $\Delta N$ is output, whereby the rotational speed N of the outdoor fan 8 adjusted by the value $\Delta N$.

The fuzzy inference, which is performed in Step 157, will be described in detail, with reference to the flow chart of FIG. 5.

A membership function for the deviation T has been prepared and stored in a memory (not shown) incorporated in the indoor controller 20. As shown in FIG. 6, the membership function consists of fuzzy variables categorized into seven classes NB, NM, NS, ZO, PS, PM, and PB which are represented by triangles. These seven classes have control values −6, −4, −2, 0, +2, +4, and +6, respectively.

Referring back to FIG. 5, in Step 201 the actual value of the deviation T is applied to the membership function, thereby calculating the grade of each fuzzy variable, which is represented by an integer ranging from 0 to 1. Assuming that the deviation T has an actual value "$T_1$," there are only two fuzzy variables having grades other than "0", i.e., the fuzzy variable of class PM and the fuzzy variable of class PS. In other words, the fuzzy variables of the other classes have the grade of "0."

A membership function for the change $\Delta T$ has been prepared and stored in the memory incorporated in the indoor controller 20, too. As shown in FIG. 7, the membership function consists of fuzzy variables categorized into seven classes NB, NM, NS, ZO, PS, PM, and PB which are represented by triangles. These seven classes have control values $-3$, $-2$, $-1$, 0, $+1$, $+2$, and $+3$, respectively.

Referring back to FIG. 5, in Step 202 the actual value of the change $\Delta T$ is applied to the membership function of FIG. 7, thereby calculating the grade of each fuzzy variable, which is represented by an integer ranging from 0 to 1. Assuming that the change $\Delta T$ has an actual value "$\Delta T_1$," there are only two fuzzy variables having grades other than "0", i.e., the fuzzy variable of class PS and the fuzzy variable of class ZO. The fuzzy variables of the other classes have the grade of "0."

"NB" stands for "Negative Big"; "NM" for "Negative Middle"; "NS" for "Negative Small"; "ZO" for "Zero"; "PS" for "Positive Small"; "PM" for "Positive Middle": "PB" for "Positive Big."

FIG. 8 shows the format of a control rule applied to calculate the grade of each fuzzy variable for an adjustment value $\Delta F_1$, from the grade of each fuzzy variable calculated for the deviation T and the grade of each fuzzy valuable calculated for the change $\Delta T$. This control rule is also stored in the memory incorporated in the indoor controller 20.

In Step 203 of FIG. 5, the grade of each fuzzy variable calculated for the deviation T and the grade of each fuzzy valuable calculated for the change $\Delta T$ are applied to the control rule, thereby calculating the grade of each fuzzy variable for the adjustment value $\Delta F_1$. As described above, only the fuzzy variable of class PM and the fuzzy variable of class PS have grades other than "0" for the deviation $T_1$, and only the fuzzy variable of class PS and the fuzzy variable of class ZO have grades other than "0" for the change $\Delta T_1$. Hence, the grades of the fuzzy variables of these four classes are applied to the control rule of FIG. 8, as indicated by circles.

In the control rule of FIG. 8, the fuzzy variables of class PM for the adjustment value $\Delta F_1$ are located, as indicated by circles, in the positions corresponding to the fuzzy variable of class PM for the deviation $T_1$ and the fuzzy variable of class ZO for the change $\Delta T_1$. To the fuzzy variable of class PM for the adjustment value $\Delta F_1$, there is applied the grade of the fuzzy variable of class PM for the deviation $T_1$ or the grade of the fuzzy variable of class ZO for the change $\Delta T_1$, which is lower than the other.

As shown in FIG. 8, the fuzzy variables of class PM for the adjustment value $\Delta F_1$ are located, as indicated by circles, in the positions corresponding to the fuzzy variable of class PM for the deviation $T_1$ and the fuzzy variable of class PS for the change $\Delta T_1$. To the fuzzy variable of class PM for the adjustment value $\Delta F_1$, there is applied the grade of the fuzzy variable of class PM for the deviation $T_1$ or the grade of the fuzzy variable of class PS for the change $\Delta T_1$, which is lower than the other.

Also, as shown in FIG. 8, the fuzzy variables of class PS for the adjustment value $\Delta F_1$ are located, as indicated by circles, in the positions corresponding to the fuzzy variable of class PS for the deviation $T_1$ and the fuzzy variable of class ZO for the change $\Delta T_1$. To the fuzzy variable of class PS for the adjustment value $\Delta F_1$, there is applied the grade of the fuzzy variable of class PS for the deviation $T_1$ or the grade of the fuzzy variable of class ZO for the change $\Delta T_1$, which is lower than the other.

Furthermore, as shown in FIG. 8, the fuzzy variables of class PM for the adjustment value $\Delta F_1$ are located, as indicated by circles, in the positions corresponding to the fuzzy variable of class PS for the deviation $T_1$ and the fuzzy variable of class PS for the change $\Delta T_1$. To the fuzzy variable of class PM for the adjustment value $\Delta F_1$, there is applied the grade of the fuzzy variable of class PS for the deviation $T_1$ or the grade of the fuzzy variable of class PS for the change $\Delta T_1$, which is lower than the other.

As a result, three fuzzy variables of class PM and one fuzzy variable of class PS are selected for the adjustment value $\Delta F_1$.

A membership function for the adjustment value $\Delta F_1$ has been prepared and stored in the memory incorporated in the indoor controller 20, too. As shown in FIG. 9, the membership function consists of fuzzy variables categorized into seven classes NB, NM, NS, ZO, PS, PM, and PB which are represented by triangles. These seven classes have control values $-6$, $-4$, $-2$, 0, $+2$, $+4$, and $+6$, respectively.

To this membership function there are applied the three fuzzy variable of class PM and the one fuzzy variable of class PS which have been selected. The sum of sets to which the four fuzzy variables are applied is represented by the dot-shaded area in FIG. 9. The gravity center of this sum of sets is the adjustment value $\Delta F_1$, Meanwhile, a membership function for the deviation H has been prepared and stored in the memory incorporated in the indoor controller 20, too. As shown in FIG. 10, this membership function consists of fuzzy variables categorized into seven classes NB, NM, NS, ZO, PS, PM, and PB which are represented by triangles. These seven classes have control values $-6$, $-4$, $-2$, 0, 2, $+4$, and $+6$, respectively.

Inn Step 204 (FIG. 5), the actual value of the deviation H is applied to the membership function of FIG. 10. The grade of each fuzzy variable of each class, which is represented by an integer ranging from 0 to 1, is thereby calculated. Assuming that the deviation H has an actual value "$H_1$," there are only two fuzzy variables having grades other than "0", i.e., the fuzzy variable of class ZO and the fuzzy variable of class NS. The fuzzy variables of the other classes have the grade of "0."

A membership function for the change $\Delta H$ has been prepared and stored in the memory incorporated in the indoor controller 20, too. As shown in FIG. 11, this membership function consists of fuzzy variables categorized into seven classes NB, NM, NS, ZO, PS, PM, and PB which are represented by triangles. These seven classes have control values $-3$, -2, -1, 0, $+1$, $+2$, and $+3$, respectively.

In Step 205 (FIG. 5), the actual value of the change $\Delta H$ is applied to the membership function of FIG. 11. The grade of each fuzzy variable of each class, which is represented by an integer ranging from 0 to 1, is thereby calculated. Assuming that the change ΔH has an actual value "ΔH$_1$," there are only two fuzzy variables having grades other than "0", i.e., the fuzzy variable of class PS and the fuzzy variable of class ZO. The fuzzy variables of the other classes have the grade of "0."

Figures 12, 13, 14:
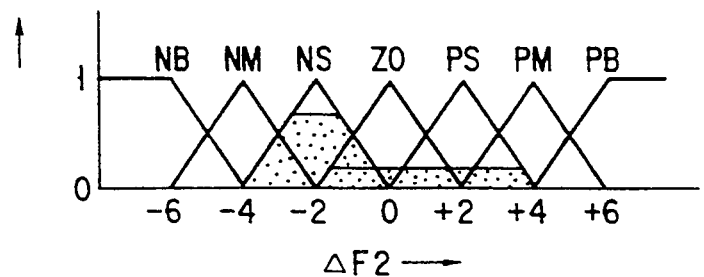
FIG. 12 is a diagram showing the format of a control rule applied in calculating the grade of each fuzzy variable for an adjustment value $\Delta F_2$.
FIG. 13 is a graph representing a membership function for the adjustment value $\Delta F_2$, which is used in the air conditioner.
FIG. 14 is a diagram showing the format of a control rule applied in calculating the grade of each fuzzy variable for an adjustment value $\Delta N$ used in the air conditioner.

FIG. 12 shows the format of a control rule applied to calculate the grade of each fuzzy variable for an adjustment value ΔF$_2$, from the grade of each fuzzy variable calculated for the deviation H and the grade of each fuzzy valuable calculated for the change ΔH. This control rule is also stored in the memory incorporated in the indoor controller 20.

In Step 206 of FIG. 5, the grade of each fuzzy variable calculated as described above is applied to the control rule, thereby calculating the grade of each fuzzy variable for the adjustment value ΔF$_2$. As mentioned above, only the fuzzy variable of class ZO and the fuzzy variable of class NS have grades other than "0" for the deviation H$_1$, and only the fuzzy variable of class ZO and the fuzzy variable of class PS have grades other than "0" for the change ΔH$_1$. Hence, the grades of the fuzzy variables of these four classes are applied to the control rule of FIG. 12, as indicated by circles.

In the control rule of FIG. 12, the fuzzy variables of class ZO for the adjustment value ΔF$_2$ are located, as indicated by circles, in the positions corresponding to the fuzzy variable of class ZO for the deviation H$_1$ and the fuzzy variable of class ZO for the change ΔH$_1$. To the fuzzy variable of class ZO for the adjustment value ΔF$_2$, there is applied the grade of the fuzzy variable of class ZO for the deviation H$_1$ or the grade of the fuzzy variable of class ZO for the change ΔH$_1$, which is lower than the other.

As shown in FIG. 12, the fuzzy variables of class PS for the adjustment value ΔF$_1$ are located, as indicated by circles, in the positions corresponding to the fuzzy variable of class ZO for the deviation H$_1$ and the fuzzy variable of class PS for the change ΔH$_1$. To the fuzzy variable of class PS for the adjustment value ΔF$_2$, there is applied the grade of the fuzzy variable of class ZO for the deviation H$_1$ or the grade of the fuzzy variable of class PS for the change ΔH$_1$, which is lower than the other.

Also, as shown in FIG. 12, the fuzzy variables of class NS for the adjustment value ΔF$_2$ are located, as indicated by circles, in the positions corresponding to the fuzzy variable of class NS for the deviation H$_1$ and the fuzzy variable of class ZO for the change ΔH$_1$. To the fuzzy variable of class NS for the adjustment value ΔF$_2$, there is applied the grade of the fuzzy variable of class NS for the deviation T$_1$ or the grade of the fuzzy variable of class ZO for the change ΔT$_1$, which is lower than the other.

Furthermore, as shown in FIG. 12, the fuzzy variables of class ZO for the adjustment value ΔF$_2$ are located, as indicated by circles, in the positions corresponding to the fuzzy variable of class NS for the deviation H$_1$ and the fuzzy variable of class PS for the change ΔH$_1$. To the fuzzy variable of class ZO for the adjustment value ΔF$_2$, there is applied the grade of the fuzzy variable of class NS for the deviation H$_1$ or the grade of the fuzzy variable of class PS for the change ΔH$_1$, which is lower than the other.

As a result, two fuzzy variables of class ZO, one fuzzy variable of class NS, and one fuzzy variable of class PS are selected for the adjustment value ΔF$_2$.

A membership function for the adjustment value Δ$_2$ has been prepared and stored in the memory incorporated in the indoor controller 20, too. As shown in FIG. 3, this membership function consists of fuzzy variables categorized into seven classes NB, NM, NS, ZO, PS, PM, and PB which are represented by triangles. These seven classes have control values $-6, -4, -2, 0, +2, +4,$ and $+6$, respectively.

To this membership function there are applied the two fuzzy variable of class ZO, the one fuzzy variable of class NS, and the one fuzzy variable of class PS which have been selected. The sum of sets to which these four fuzzy variables are applied is represented by the dot-shaded area in FIG. 13. The gravity center of this sum of sets is the adjustment value ΔF$_2$.

The temperature of the air being supplied into the room depends not only on the drive frequency F of the compressor 1, but also on the rotational speed N of the outdoor fan 8. Thus, in Step 207, weight $\omega$ $(0<\omega<1)$ is applied to the sum of sets (FIG. 9) for the adjustment value ΔF$_1$.

In Step 208 (FIG. 5), the sum of sets (FIG. 9) for the adjustment value ΔF$_1$, thus weighted, and the sum of sets (FIG. 13) for the adjustment value ΔF$_2$ are synthesized into an area. In Step 209, the gravity center of the area obtained in Step 208 is determined for as a final adjustment value ΔF.

In Step 210, a value ΔN for adjusting the rotational speed N of the outdoor fan 8 is calculated by applying the control rule illustrated in FIG. 14 and stored in the indoor controller 20, to the grades of fuzzy variables for the deviation T which have been obtained in Step 201 and the grades of fuzzy variables for the change ΔT which have been obtained in Step 202.

Figure 15:
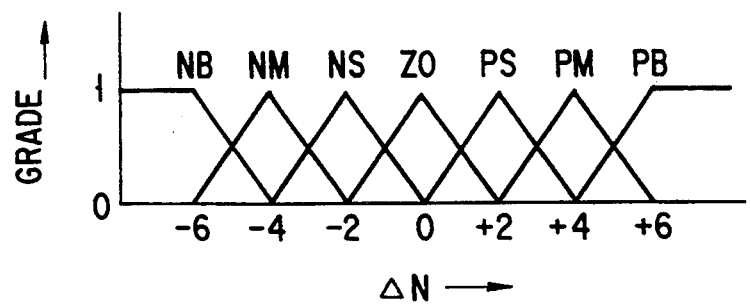
FIG. 15 is a graph representing a membership function for the adjustment value $\Delta N$.

A membership function for the adjustment value ΔF has been prepared and stored in the memory used in the indoor controller 20. As shown in FIG. 15, this membership function consists of fuzzy variables categorized into seven classes NB, NM, NS, ZO, PS, PM, and PB which are represented by triangles. These seven classes have control values $-6, -4, -2, 0, +2, +4,$ and $+6$, respectively.

The grades of fuzzy variables, which have been obtained in Step 210 are applied to this membership function of FIG. 15. The sets corresponding to the grades thus applied to the membership function are added together in Step 211, obtaining a sum of these sets. The control value corresponding to the gravity center of the area defined by the sum of sets is used as the adjustment value ΔN. Thus, the fuzzy inference is completed.

Figure 16:
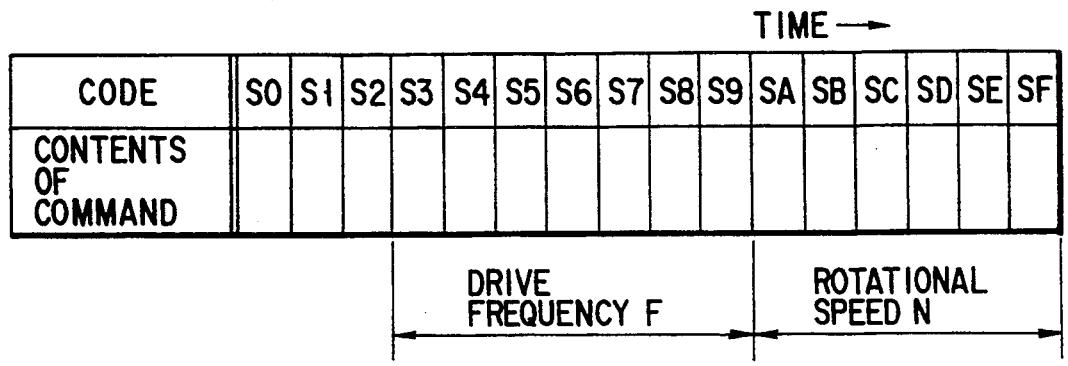
FIG. 16 is a diagram illustrating the serial data used in the air conditioner.

The drive frequency F of the compressor 1 and the rotational speed N of the outdoor fan 8 are supplied from the indoor controller 20 to the outdoor controller 30, in the form of serial data formed of two commands, each of which consists of several codes. More specifically, as shown in FIG. 16, the codes S0 to S9 are allocated to the drive frequency command, and codes SA to SF to the rotational speed command. The serial data is sent at two times, first the drive frequency command, then the rotational speed command.

Figure 17:
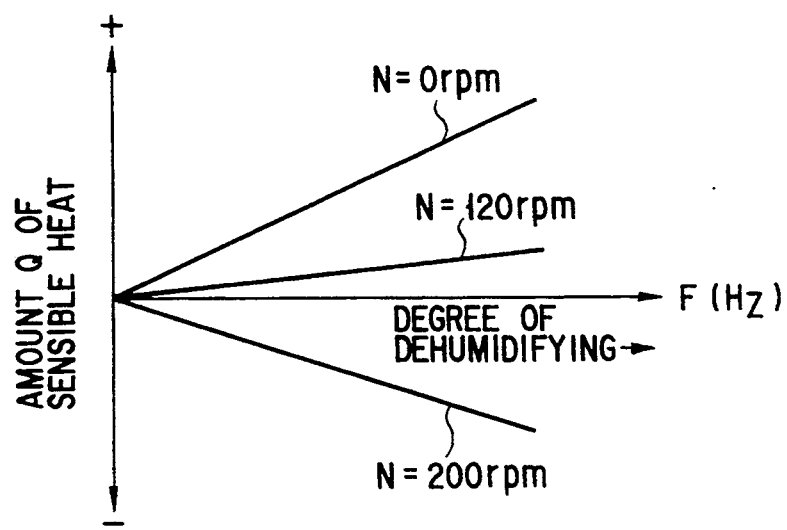
FIG. 17 is a graph representing the relationship the drive frequency F of the compressor, the degree of dehumidifying, the rotational speed N of the compressor, and the amount Q sensible heat, which relationship is observed in the air conditioner.

The drive frequency F of the compressor 1, the degree of dehumidifying, the rotational speed N of the outdoor fan 8, the amount Q of sensible heat at the outdoor heat exchanger 3 have the relationship illustrated in FIG. 17. As can be understood from FIG. 17, the degree of dehumidifying, proportional to the indoor humidity, is a function of the drive frequency F of the compressor 1, and the amount of heat in the room, proportional to the indoor temperature, is a function of both the drive frequency F of the compressor 1 and the rotational speed N of the outdoor fan 8. In other words, the speed N of the outdoor fan 8 determines the amount Q of sensible heat at the outdoor heat exchanger 3, and the drive frequency F of the compressor 1 determines the degree to which the room should be dehumidified. The amount Q of sensible heat influences the indoor temperature.

Hence, the indoor temperature and the indoor humidity can simultaneously be controlled by adjusting the drive frequency F of the compressor 1 and the speed N of the outdoor fan 8. As has been described, the drive frequency F and the speed N are adjusted by the values $\Delta F$ and $\Delta N$, both fuzzy-inferred from the deviation T of the indoor temperature Ta from the set temperature Ts, the change $\Delta T$ in the deviation T and the deviation H of the indoor humidity Ha from the set humidity Hs, the change $\Delta H$ in the deviation H. The air conditioner according to the invention responds well to various load conditions, such as the structure of the building including the room, the climate of the region where the building is located and the bodily sensation of the persons staying in the room. It can reliably control the indoor temperature and the indoor humidity even when the windows to the room are opened fully or closed completely. Furthermore, since the sum of sets for the adjustment value $\Delta F_1$ or $\Delta F_2$ has already been weighted when the adjustment value $\Delta F$ is obtained in Step 209, the indoor temperature can be controlled in priority to the indoor humidity, or vice versa.

In the fuzzy inference described above, the value $\Delta F_1$ is inferred from the deviation T and the change $\Delta T$ in the deviation T, the value $\Delta F_2$ is inferred from the deviation H and the change $\Delta H$ in the deviation H, the value $\Delta F$ is obtained by synthesizing the values $\Delta F_1$ and $\Delta F_2$, and the value $\Delta N$ is obtained from the deviation T and the change $\Delta T$. Any other fuzzy inference may be performed in the air conditioner.

For instance, the change $\Delta Q$ in the amount Q of sensible heat may be inferred from the deviation T and the change $\Delta T$, the value $\Delta F$ may be inferred from the deviation H and the change $\Delta H$, and the value $\Delta N$ may be inferred from the value $\Delta F$ and the change $\Delta Q$—on the basis of the relationship (FIG. 17) among the drive frequency F, the degree of dehumidifying, the rotational speed N the amount Q of sensible heat. This fuzzy inference will be explained in detail, with reference to the flow chart of FIG. 18.

As shown in FIG. 18, the grade of each fuzzy variable for the deviation T is calculated in Step 301. In Step 302, the grade of each fuzzy variable for the change $\Delta T$ is calculated. Then, in Step 303, the grade of each fuzzy variable for T and that of each fuzzy variable for $\Delta T$ are applied to prescribed fuzzy control rules, thereby calculating the grade of each fuzzy variable for the change $\Delta Q$ in the amount Q of sensible heat.

In Step 304, the grade of each fuzzy variable for the deviation H is calculated. In Step 305, the grade of each fuzzy variable for the change $\Delta H$ is calculated. In Step 306, the grade of each fuzzy variable for H and that of each fuzzy variable for $\Delta H$ are applied to prescribed fuzzy control rules, thereby calculating the grade of each fuzzy variable for the value $\Delta F$. In Step 307, the grade of each fuzzy variable for $\Delta F$ is applied to a membership function for $\Delta F$, thereby determining a value $\Delta F$.

Next, in Step 308, the grade of each fuzzy variable for Q, calculated in step 303, and the grade of each fuzzy variable for F, calculated in Step 306, are applied to prescribed control rules, thus calculating the grade of each fuzzy variable for $\Delta N$. In Step 309, the grade of each variable for $\Delta N$ is applied to a membership function for $\Delta N$.

Furthermore, the value $\Delta F$ may be inferred from the deviation T and the deviation H, and the value $\Delta N$ may be inferred from the deviation T and the change $\Delta T$ in the deviation T. This fuzzy inference will be explained in detail, with reference to the flow chart of FIG. 19.

As shown in FIG. 19, the grade of each fuzzy variable for the deviation T is calculated in Step 401. Next, in Step 402 the grade of each fuzzy variable for the deviation H is calculated. In Step 403, the grade of each fuzzy variable for T and that of each fuzzy variable for H are applied to prescribed control rules, thus calculating the grade of each fuzzy variable for the value $\Delta F$. In Step 404, the grade for each fuzzy variable for $\Delta F$ is applied to a predetermined membership function, thereby determining the value $\Delta F$.

Then, in Step 405, the grade of each fuzzy variable for the value $\Delta T$ is calculated. In Step 406, the grade of each fuzzy variable for T, calculated in Step 401, and the grade of each fuzzy variable for the $\Delta T$, calculated in Step 405, are applied to prescribed control rules, thereby obtaining the grade of each fuzzy variable for $\Delta N$. Next, in Step 407, the grade obtained in Step 406 is applied to a prescribed membership function for the value $\Delta N$, thereby determining the value $\Delta N$.

In the embodiment described above, the change $\Delta T$ in the deviation T and the change $\Delta H$ in the deviation H are used in the fuzzy inference. Instead, a change $\Delta Ta$ in the indoor temperature Ta and a change $\Delta Ha$ in the indoor humid Ha may be obtained and applied to the fuzzy inference.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An air conditioner apparatus capable of performing a dehumidifying operation, comprising:

a compressor for compressing refrigerant and supplying compressed refrigerant;

an outdoor heat exchanger for exchanging heat between the refrigerant and outdoor air;

an outdoor fan for supplying the outdoor air into said outdoor heat exchanger;

pressure reducing means for reducing the pressure of the refrigerant;

a first indoor heat exchanger for exchanging heat between the refrigerant and indoor air;

an electric expansion valve whose opening can change;

a second indoor heat exchanger for exchanging heat between the refrigerant and the indoor air;

an indoor fan for circulating the indoor air through said second indoor heat exchanger and said first indoor heat exchanger;

first control means for supplying the refrigerant from said compressor back in to said compressor through said outdoor heat exchanger, said pressure reducing means, said first indoor heat exchanger, said electric expansion valve and said second indoor heat exchanger, and for opening said electric expansion valve fully, to thereby perform a cooling operation;

second control means for supplying the refrigerant from said compressor back into said compressor through said first indoor heat exchanger, said electric expansion valve and said second indoor heat exchanger, and for reducing the opening of said electric expansion valve, to thereby perform a dehumidifying operation;

an indoor temperature sensor for detecting indoor temperature (Ta);

an indoor humidity sensor for detecting indoor humidity (Ha);

first detection means for detecting a deviation (T) of the indoor temperature (Ta) from a preset indoor temperature (Ts) and a change ($\Delta T$) in the deviation (T), during the dehumidifying operation;

second detection means for detecting a deviation (H) of the indoor humidity (Ha) from a preset indoor humidity (Hs) and a change ($\Delta H$) in the deviation (H);

adjustment value calculating means for performing fuzzy inference based on the deviation (T), the change ($\Delta T$), the deviation (H) and the change ($\Delta H$), to thereby calculate an adjustment value ($\Delta F$) for adjusting a drive frequency (F) of said compressor and an adjustment value ($\Delta N$) for adjusting a rotational speed (N) of said outdoor fan;

first adjustment means for adjusting the drive frequency (F) of said compressor by said adjustment value ($\Delta F$); and second adjustment means for adjusting the rotational speed (N) of said outdoor fan by said adjustment value ($\Delta N$).

2. An apparatus according to claim 1, wherein said adjustment value calculating means calculates an adjustment value ($\Delta F_1$) from the deviation (T) and the change ($\Delta T$), calculates a an adjustment value ($\Delta F_2$) from the deviation (H) and the change ($\Delta H$), and synthesize the adjustment values ($\Delta F_1$) and ($\Delta F_2$), to thereby obtaining said adjustment value ($\Delta F$), and calculates said adjustment value ($\Delta N$) from the deviation (T) and the change ($\Delta T$).

3. An apparatus according to claim 1, wherein an adjustment value ($\Delta Q$) for adjusting an amount (Q) of sensible heat at said outdoor heat exchanger, from the deviation (T) and the change ($\Delta T$), calculates said adjustment value ($\Delta F$) from the deviation (H) and the change ($\Delta H$), and calculates said adjustment value ($\Delta N$) from the adjustment value ($\Delta Q$) and the adjustment value ($\Delta F$).

4. An apparatus according to claim 1, wherein said adjustment value calculating means calculates said adjustment value ($\Delta F$) from the deviation (T) and the deviation (H), and calculates said adjustment value ($\Delta N$) from the deviation (T) and the change ($\Delta T$).

5. An apparatus according to claim 1, further comprising third control means for supplying the refrigerant from said compressor back into said compressor through said second indoor heat exchanger, said electric expansion valve, and said first indoor heat exchanger, said pressure reducing means and said outdoor heat exchanger, and for opening said electric expansion valve fully, to thereby perform a heating operation.

6. An air conditioner apparatus capable of performing a dehumidifying operation, comprising:

a compressor for compressing refrigerant and sup plying compressed refrigerant;

an outdoor heat exchanger for exchanging heat between the refrigerant and outdoor air;

an outdoor fan for supplying the outdoor air into said outdoor heat exchanger;

pressure reducing means for reducing the pressure of the refrigerant;

a first indoor heat exchanger for exchanging heat between the refrigerant and indoor air;

an electric expansion valve whose opening can change;

a second indoor heat exchanger for exchanging heat between the refrigerant and the indoor air;

an indoor fan for circulating the indoor air through said second indoor heat exchanger and said first indoor heat exchanger;

first control means for supplying the refrigerant from said compressor back in to said compressor through said outdoor heat exchanger, said pressure reducing means, said first indoor heat exchanger, said electric expansion valve and said second indoor heat exchanger, and for opening said electric expansion valve fully, to thereby perform a cooling operation;

second control means for supplying the refrigerant from said compressor back into said compressor through said first indoor heat exchanger, said electric expansion valve and said second indoor heat exchanger, and for reducing the opening of said electric expansion valve, to thereby perform a dehumidifying operation;

an indoor temperature sensor for detecting indoor temperature (Ta);

an indoor humidity sensor for detecting indoor humidity (Ha);

first detection means for detecting a deviation (T) of the indoor temperature (Ta) from a preset indoor temperature (Ts) and a change ($\Delta Ta$) in the indoor temperature (Ta), during the dehumidifying operation;

second detection means for detecting a deviation (H) of the indoor humidity (Ha) from a preset indoor humidity (Hs) and a change ($\Delta H$) in the deviation (H);

adjustment value calculating means for performing fuzzy inference based on the deviation (T), the change ($\Delta Ta$), the deviation (H) and the change ($\Delta H$), to thereby calculate an adjustment value ($\Delta F$) for adjusting a drive frequency (F) of said compressor and an adjustment value ($\Delta N$) for adjusting a rotational speed (N) of said outdoor fan;

first adjustment means for adjusting the drive frequency (F) of said compressor by said adjustment value ($\Delta F$); and second adjustment means for adjusting the rotational speed (N) of said outdoor fan by said adjustment value ($\Delta N$).

7. An apparatus according to claim 6, wherein said adjustment value calculating means calculates an adjustment value ($\Delta F_1$) from the deviation (T) and the change ($\Delta T$), calculates a an adjustment value ($\Delta F_2$) from the deviation (H) and the change ($\Delta H$), and synthesize the adjustment values ($\Delta F_1$) and ($\Delta F_2$), to thereby obtaining said adjustment value ($\Delta F$), and calculates said adjustment value (ΔN) from the deviation (T) and the change (ΔT).

8. An apparatus according to claim 6, wherein an adjustment value (ΔQ) for adjusting an amount (Q) of sensible heat at said outdoor heat exchanger, from the deviation (T) and the change (ΔT), calculates said adjustment value (ΔF) from the deviation (H) and the change (ΔH), and calculates said adjustment value (ΔN) from the adjustment value (ΔQ) and the adjustment value (ΔF).

9. An apparatus according to claim 6, wherein said adjustment value calculating means calculates said adjustment value (ΔF) from the deviation (T) and the deviation (H), and calculates said adjustment value (ΔN) from the deviation (T) and the change (ΔT).

10. An apparatus according to claim 6, further comprising third control means for supplying the refrigerant from said compressor back into said compressor through said second indoor heat exchanger, said electric expansion valve, and said first indoor heat exchanger, said pressure reducing means and said outdoor heat exchanger, and for opening said electric expansion valve fully, to thereby perform a heating operation.

* * * * *